(12) United States Patent
Chae et al.

(10) Patent No.: US 8,626,069 B2
(45) Date of Patent: Jan. 7, 2014

(54) APPARATUS AND METHOD FOR BEAMFORMING CONSIDERING INTERFERENCE AMOUNT IN BROADBAND WIRELESS COMMUNICATION SYSTEM

(75) Inventors: Heon-Ki Chae, Seongnam-si (KR); Keun-Chul Hwang, Yongin-si (KR); Soon-Young Yoon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 606 days.

(21) Appl. No.: 12/386,464

(22) Filed: Apr. 17, 2009

(65) Prior Publication Data

US 2009/0264087 A1 Oct. 22, 2009

(30) Foreign Application Priority Data

Apr. 17, 2008 (KR) .......................... 10-2008-0035632

(51) Int. Cl.
| | |
|---|---|
| *H04B 1/00* | (2006.01) |
| *H04B 15/00* | (2006.01) |
| *H04M 1/00* | (2006.01) |
| *H04B 7/02* | (2006.01) |
| *H04L 1/02* | (2006.01) |
| *H04B 17/00* | (2006.01) |

(52) U.S. Cl.
USPC ............... 455/63.1; 455/114.2; 455/115.1; 455/562.1; 375/267

(58) Field of Classification Search
USPC .............. 455/63.1, 63.4, 67.11, 67.13, 114.2, 455/115.1, 115.3, 562.1; 375/267
See application file for complete search history.

(56) References Cited

U.S. PATENT DOCUMENTS

| | | | |
|---|---|---|---|
| 7,003,310 B1 * | 2/2006 | Youssefmir et al. ........... | 455/522 |
| 2008/0056414 A1 * | 3/2008 | Kim et al. ..................... | 375/347 |

* cited by examiner

*Primary Examiner* — Lincoln Donovan
*Assistant Examiner* — Colleen O Toole (57) ABSTRACT

An apparatus and method for beamforming in a broadband wireless communication are provided. The apparatus includes a first calculator for determining a degradation factor to indicate a degradation degree of a target signal due to interference cancellation by using a target channel matrix and at least one interfering channel matrix, a second calculator for determining a new noise power value to be used to calculate a beamforming vector if the degradation factor is greater than or equal to a threshold, and for determining the beamforming vector by using the new noise power value, and a beamformer for performing beamforming on a signal transmitted/received with a target Mobile Station (MS) by using the beamforming vector.

10 Claims, 4 Drawing Sheets

——— : DIRECTION OF TARGET SIGNAL
- - - - : DIRECTION OF INTERFERING SIGNAL (PRIOR ART)

APPARATUS AND METHOD FOR BEAMFORMING CONSIDERING INTERFERENCE AMOUNT IN BROADBAND WIRELESS COMMUNICATION SYSTEM

CROSS-REFERENCE TO RELATED APPLICATION(S) AND CLAIM OF PRIORITY

The present application claims the benefit under 35 U.S.C. §119(a) of a Korean patent application filed in the Korean Intellectual Property Office on Apr. 17, 2008 and assigned Serial No. 10-2008-0035632, the entire disclosure of which is hereby incorporated by reference.

TECHNICAL FIELD OF THE INVENTION

The present invention relates to a broadband wireless communication system. More particularly, the present invention relates to an apparatus and method for beamforming considering an interference amount in a broadband wireless communication system.

BACKGROUND OF THE INVENTION

In a broadband wireless communication system, a Base Station (BS) is in charge of a geographical region referred to as a cell that is determined according to a radio-wave propagation distance. That is, the BS communicates with Mobile Stations (MSs) existing within a cell of the BS through a wireless channel. In this case, mutual interference exists between neighboring cells. That is, in case of downlink communication, an MS located in a cell boundary experiences interference due to a signal transmitted from a BS of a neighboring cell, and in case of uplink communication, the BS experiences interference due to a signal transmitted from the MS located in the neighboring cell boundary.

To cancel interference from the neighboring cell, that is, to remove signals other than a Transmit (Tx)/Receive (Rx) signal of a target MS, the BS performs beamforming on the Tx/Rx signal. The beamforming is an operation for transforming the Tx/Rx signal by using a beamforming vector. A format of the beamforming vector varies depending on the purpose of beamforming. Therefore, if the purpose of beamforming is minimization of interference from the neighboring cell, a top priority is to decrease a size of an interfering signal when the beamforming vector is determined.

Figure 1A:
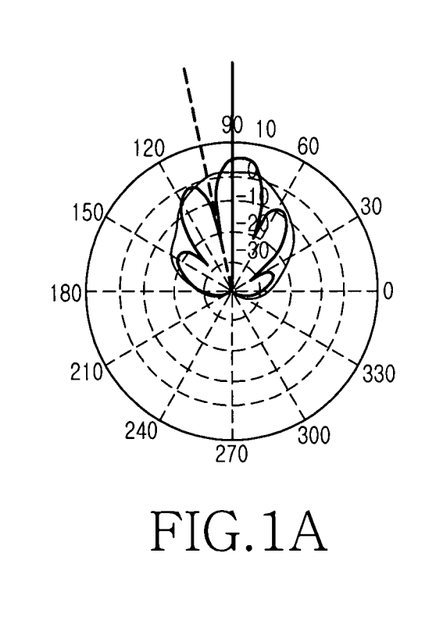
FIGS. 1A to 1C illustrate examples of a beam pattern with respect to a signal correlation in a broadband wireless communication system.
Figure 1B:
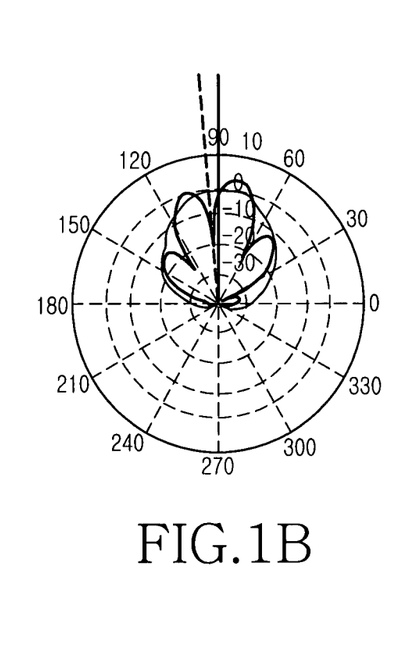
Figure 1C:
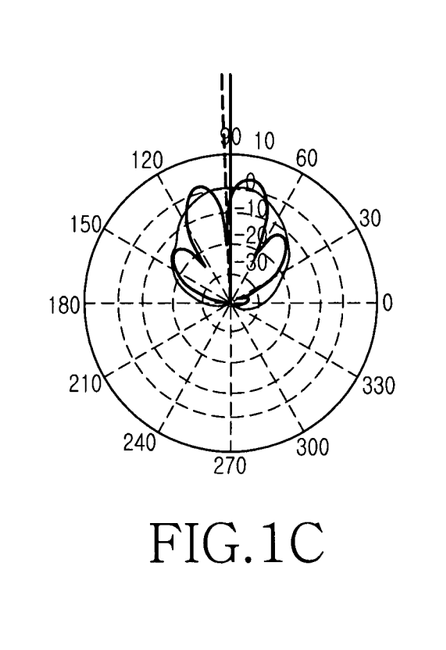

In case of using the beamforming vector whose top priority is to decrease the size of the interfering signal, if a target channel matrix and an interfering channel matrix are independent from each other, the BS may smoothly transmit and receive a target signal. However, if independence is not fully maintained between the target channel matrix and the interfering channel matrix, beamforming for interference cancellation has an effect on the target signal. For example, a beam pattern may change as illustrated in FIGS. 1A to 1C according to a correlation between the target channel matrix and the interfering channel matrix. As illustrated in FIGS. 1A to 1C, the closer the direction of the interfering signal to the direction of the target signal, the smaller the size of the target signal.

As described above, when beamforming for interference cancellation is performed, the interference cancellation results in degradation of the target signal, which leads to an adverse affect to link quality with the target MS. That is, even if interference is cancelled, significant decrease in the size of the target signal results in deterioration of communication quality. Accordingly, there is a need for a method for solving a problem in which the size of the target signal significantly decreases when beamforming is performed to improve communication quality by interference cancellation.

SUMMARY OF THE INVENTION

To address the above-discussed deficiencies of the prior art, it is a primary aspect of the present invention to provide an apparatus and method for avoiding significant decrease in a size of a normal signal due to interference cancellation in a broadband wireless communication system.

Another aspect of the present invention is to provide an apparatus and method for beamforming considering a correlation between a target channel matrix and an interfering channel matrix in a broadband wireless communication system.

Another aspect of the present invention is to provide an apparatus and method for calculating a degradation factor to indicate a signal power ratio of when a beamforming vector whose top priority is interference cancellation is used to when a beamforming vector whose top priority is a signal gain is used in a broadband wireless communication system.

Another aspect of the present invention is to provide an apparatus and method for calculating a beamforming vector when a degradation factor is greater than or equal to a threshold in a broadband wireless communication system.

In accordance with an aspect of the present invention, a BS apparatus in a broadband wireless communication system is provided. The apparatus includes a first calculator for determining a degradation factor to indicate a degradation degree of a target signal due to interference cancellation by using a target channel matrix and at least one interfering channel matrix, a second calculator for determining a new noise power value to be used to calculate a beamforming vector if the degradation factor is greater than or equal to a threshold, and for determining the beamforming vector by using the new noise power value, and a beamformer for performing beamforming on a signal transmitted/received with a target MS by using the beamforming vector.

In accordance with another aspect of the present invention, a method of operating a BS in a broadband wireless communication system is provided. The method includes determining a degradation factor to indicate a degradation degree of a target signal due to interference cancellation by using a target channel matrix and at least one interfering channel matrix, determining a new noise power value to be used to calculate a beamforming vector if the degradation factor is greater than or equal to a threshold, determining the beamforming vector by using the new noise power value, and performing beamforming on a signal transmitted/received with a target MS by using the beamforming vector.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 2:
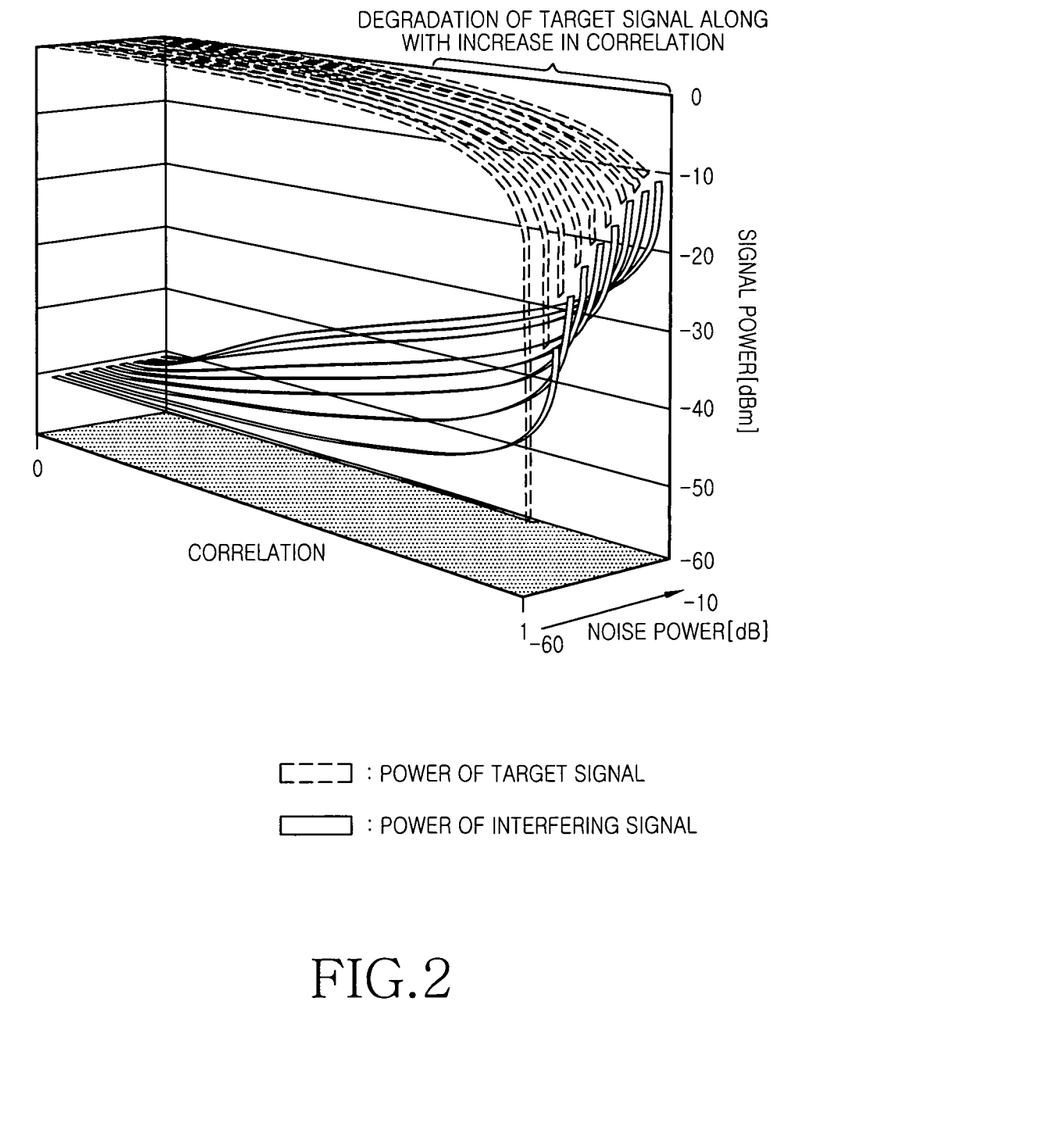
FIG. 2 illustrates an example of changes in the effect of beamforming with respect to a noise power value in a broadband wireless communication system.
Figure 3:
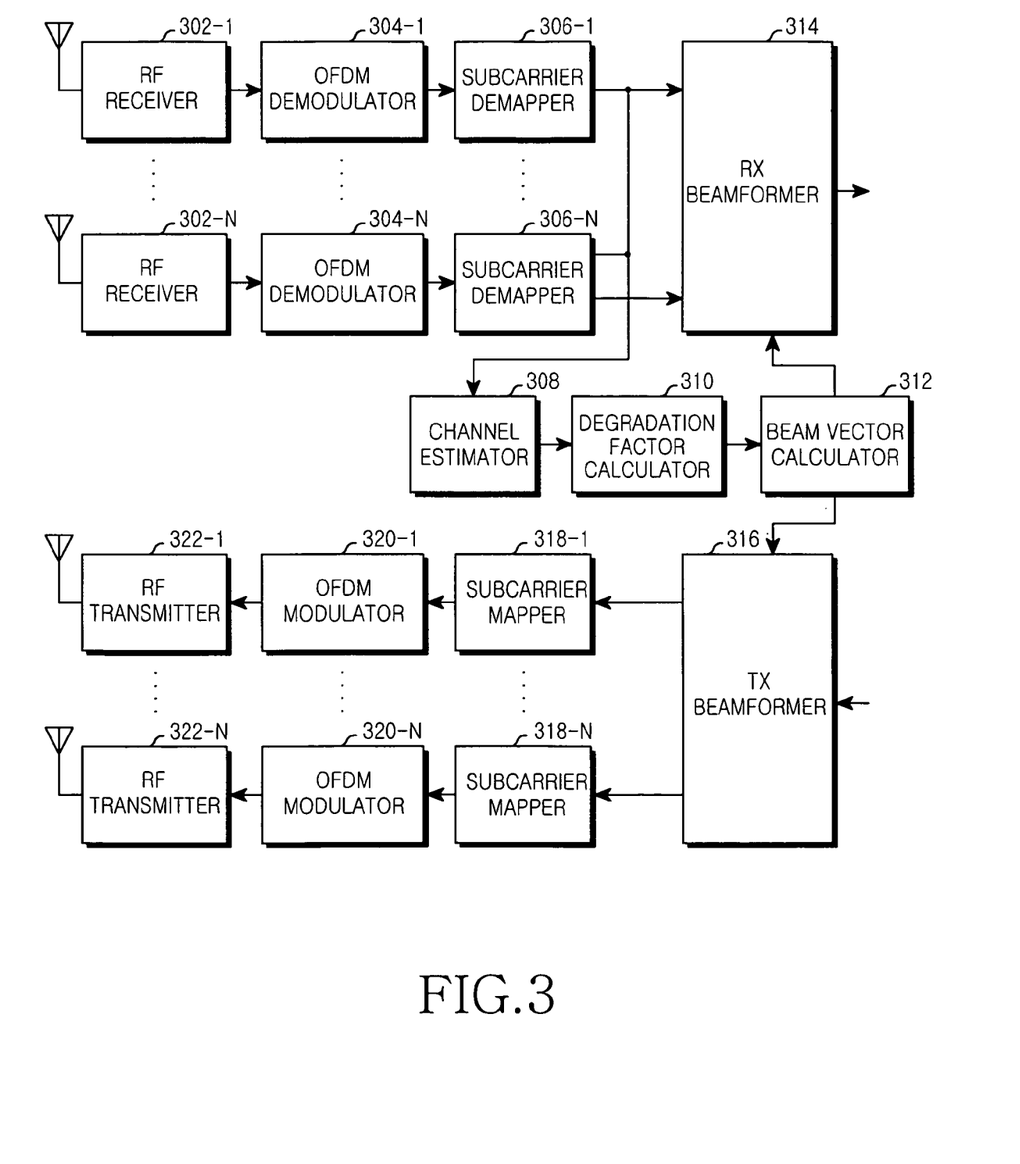
FIG. 3 is a block diagram illustrating a structure of a BS in a broadband wireless communication system according to an exemplary embodiment of the present invention.
Figure 4:
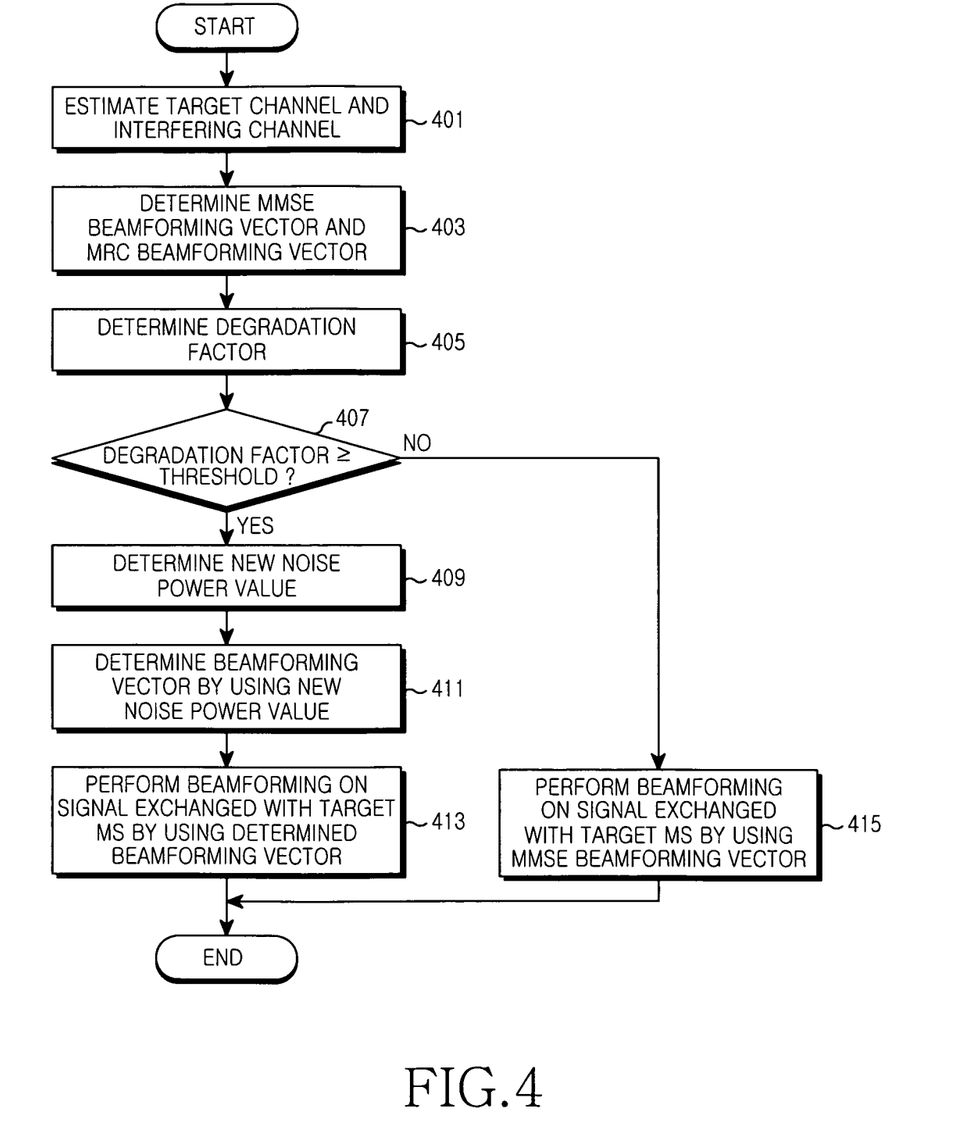
FIG. 4 is a flowchart illustrating an operation of a BS in a broadband wireless communication system according to an exemplary embodiment of the present invention.

FIGS. 2 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present invention described hereinafter relates to a technique for avoiding significant decrease in a size of a normal signal due to interference cancellation in a broadband wireless communication system. Although an Orthogonal Frequency Division Multiplexing (OFDM)/Orthogonal Frequency Division Multiple Access (OFDMA)-based wireless communication system will be described below as an example, the present invention may equally apply to other types of wireless communication systems.

First, a beamforming method proposed in the present invention will be described with reference to Equations.

A Minimum Mean Square Error (MMSE)-based beamforming vector is one of the beamforming vectors whose top priority is to suppress an interfering signal. The MMSE-based beamforming vector is calculated according to Equation 1:

$$W = h_d^H R^{-1}$$

$$R = h_i^H h_i + \sigma^2 I \quad \text{[Eqn. 1]}$$

In Equation 1, W denotes an MMSE beamforming vector, $h_d$ denotes a target channel matrix, $h_i$ denotes an interfering channel matrix, $\sigma^2$ denotes a noise power value, and I denotes a unit matrix.

If several interferences are present, the matrix R is expressed by Equation 2:

$$R_{NI} = \sum_{n=1}^{N} h_{i_n} h_{i_n}^H + \sigma^2 I \quad \text{[Eqn. 2]}$$

In Equation 2, $h_i$ denotes an interfering channel matrix, $\sigma^2$ denotes a noise power value, and I denotes a unit matrix.

Beamforming has a different effect according to a noise power value used when the MMSE-based beamforming vector is calculated. For example, regarding the effect of beamforming as a size of an interfering signal and a size of a target signal according to a correlation between a target channel matrix and an interfering channel matrix, the effect of beamforming would change with respect to the noise power value as illustrated in FIG. 2. FIG. 2 illustrates an example of changes in the effect of beamforming with respect to a noise power value in a broadband wireless communication system. Referring to FIG. 2, the greater the correlation between the target signal and the interfering signal, the smaller the power difference between the target signal and the interfering signal. In this case, when the noise power value is set to be high, the effect of interference cancellation decreases, and a degradation amount of the target signal decreases.

Therefore, according to the present invention, a BS regulates the noise power value by performing the following operations to calculate an optimal beamforming vector.

The BS calculates a Maximum Ratio Combining (MRC) beamforming vector and an MMSE beamforming vector by using an estimated interfering channel matrix and an estimated target channel matrix. The MRC beamforming vector is a beamforming vector that prioritizes only a gain of the target signal without considering interference cancellation. The MMSE beamforming vector is a beamforming vector that prioritizes interference cancellation. Therefore, by using the MRC beamforming vector and the MMSE beamforming vector, a degradation degree of a target signal due to the use of the MMSE beamforming vector may be predicted. In the present invention, a Degradation Factor (DF) is defined as a metric indicating the degradation degree of the target signal, and is calculated by Equation 3:

$$DF[\text{dB}] = 10 \times \log 10 \left( \frac{\|w_{mrc}^H h_d\|^2}{\|w_{mmse}^H h_d\|^2} \right) \quad \text{[Eqn. 3]}$$

In Equation 3 above, DF denotes a degradation factor, $w_{mrc}$ denotes an MRC beamforming vector, $w_{mmse}$ denotes an MMSE beamforming vector, and $h_d$ denotes a target channel matrix.

If the degradation factor calculated by Equation 3 above is less than a threshold, the BS calculates a beamforming vector according to Equation 1. Otherwise, if the degradation factor is greater than or equal to the threshold, a new noise power value is calculated to obtain a signal power ratio identical to the threshold. For example, the BS calculates the new noise power value according to Equation 4.

$$\sigma_{new}^2 = \sqrt{\frac{\|h_d h_i^H\|^2 \|h_\perp\|^2}{\frac{\|h_d\|^4}{DF_{th}\|w_{mmse}^H h_d\|^2} - \|h_d\|^2}} - \|h_\perp\|^2 \quad \text{[Eqn. 4]}$$

In Equation 4, $\sigma_{new}^2$ denotes a new noise power value, $h_d$ denotes a target channel matrix, $h_\parallel$ denotes a component parallel to the target channel matrix in an interfering channel matrix, $h_\perp$ denotes a component orthogonal to the target channel matrix in the interfering channel matrix, $DF_{th}$ denotes a linear scale value of a degradation factor threshold, and $w_{mrc}$ denotes an MRC beamforming vector.

The MMSE beamforming vector may be calculated by Equation 5 by using the new noise power value calculated according to Equation 4.

$$w_{mmse} = R_{NI}^{-1} h_d = (h_i h_i^H + \sigma_{new}^2 I)^{-1} h_d \qquad [\text{Eqn. 5}]$$

In Equation 5 above, $w_{mmse}$ denotes an MMSE beamforming vector, $h_d$ denotes a target channel matrix, $h_i$ denotes an interfering channel matrix, and $\sigma_{new}^2$ denotes a new noise power value.

The interfering channel matrix $h_i$ may be expressed by a sum of the component $h_\parallel$ parallel to the target channel matrix and the component $h_\perp$ orthogonal to the target channel matrix. The component $h_\parallel$ and the component $h_\perp$ are calculated by Equation 6:

$$h_i = h_\parallel + h_\perp \qquad [\text{Eqn. 6}]$$
$$h_\parallel = h_d^H h_i \frac{h_d}{\|h_d\|^2}$$
$$h_\perp = h_i - h_\parallel$$

In Equation 6 above, $h_i$ denotes an interfering channel matrix, $h_\parallel$ denotes a component parallel to a target channel matrix in the interfering channel matrix, $h_\perp$ denotes a component orthogonal to the target channel matrix in the interfering channel matrix, and $h_d$ denotes the target channel matrix.

The MMSE beamforming vector may be expressed by Equation 7 by using the component $h_\parallel$ and the component $h_\perp$.

$$\{(h_\parallel + h_\perp)(h_\parallel + h_\perp)^H + \sigma_{new}^2 I\}^{-1} h_d = \{h_\parallel h_\parallel^H + h_\parallel h_\perp^H + h_\perp h_\parallel^H + h_\perp h_\perp^H + \sigma_{new}^2 I\}^{-1} h_d \qquad [\text{Eqn. 7}]$$

In Equation 7, $h_\parallel$ denotes a component parallel to a target channel matrix in an interfering channel matrix, $h_\perp$ denotes a component orthogonal to the target channel matrix in the interfering channel matrix, $\sigma_{new}^2$ denotes a new noise power value, and $h_d$ denotes the target channel matrix.

Equation 7 is simplified into Equation 9 according to Equation 8:

$$(A + BCD)^{-1} = A^{-1} - A^{-1} B(C^{-1} + DA^{-1}B)^{-1} DA^{-1} \qquad [\text{Eqn. 8}]$$

In Equation 8 above, A, B, C, and D are arbitrary matrixes.

If $h_\parallel h_\perp^H + h_\perp h_\parallel^H + h_\perp h_\perp^H + \sigma_{new}^2 I$ is replaced with A, $h_\parallel$ is replaced with B, I is replaced with C, $h_\parallel^H$ is replaced with D, and $$\frac{h_d^H h_i}{\|h_d\|^2}$$

is replaced with $c_\parallel$, then Equation 7 above is simplified into Equation 9:

$$\{A^{-1} - A^{-1} h_\parallel (I + h_\parallel^H A^{-1} h_\parallel)^{-1} h_\parallel^H A^{-1}\} h_d = \qquad [\text{Eqn. 9}]$$
$$A^{-1} h_d \left(1 - \frac{c_\parallel^2 h_d^H A^{-1} h_\parallel}{1 + c_\parallel h_d^H \alpha^{-1} h_\parallel}\right) =$$
$$c_1 \{h_\parallel h_\perp^H + h_\perp h_\parallel^H + h_\perp h_\perp^H + \sigma_{new}^2 I\}^{-1} h_d$$

In Equation 9, $h_\parallel$ denotes a component parallel to a target channel matrix in an interfering channel matrix, $h_\perp$ denotes a component orthogonal to the target channel matrix in the interfering channel matrix, $\sigma_{new}^2$ denotes a new noise power value, and $h_d$ denotes the target channel matrix.

If $h_\perp h_\parallel^H + h_\perp h_\perp^H + \sigma^2 I$ is replaced with A, $h_\parallel$ is replaced with B, I is replaced with C, and $h_\perp^H$ is replaced with D, then Equation 9 above is simplified into Equation 10 according to Equation 8.

$$c_1 \{A^{-1} - A^{-1} h_\parallel (I + h_\perp^H \alpha^{-1} h_\parallel)^{-1} h_\perp^H A^{-1}\} h_d = \qquad [\text{Eqn. 10}]$$
$$c_1 \left\{A^{-1} h_d - \frac{A^{-1} c_\parallel h_d h_\perp^H A^{-1} h_d}{1 + h_\perp^H A^{-1} c_\parallel h_d}\right\} =$$
$$c_1 A^{-1} h_d \left\{1 - \frac{c_\parallel h_\perp^H A^{-1} h_d}{1 + h_\perp^H A^{-1} c_\parallel h_d}\right\} =$$
$$c_2 \{h_\perp h_\parallel^H + h_\perp h_\perp^H + \sigma_{new}^2 I\}^{-1} h_d$$

In Equation 10 above, $h_\parallel$ denotes a component parallel to a target channel matrix in an interfering channel matrix, $h_\perp$ denotes a component orthogonal to the target channel matrix in the interfering channel matrix, $\sigma_{new}^2$ denotes a new noise power value, and $h_d$ denotes the target channel matrix.

If $h_\perp h_\perp^H + \sigma^2 I$ is replaced with A, $h_\perp$ is replaced with B, I is replaced with C, and $h_\parallel^H$ is replaced with D, then Equation 10 above is simplified into Equation 11 according to Equation 8.

$$c_2 \{A^{-1} - A^{-1} h_\perp (I + h_\parallel^H A^{-1} h_\perp)^{-1} h_\parallel^H A^{-1}\} h_d = \qquad [\text{Eqn. 11}]$$
$$c_2 \left\{A^{-1} h_d - A^{-1} h_\perp \frac{h_\parallel^H A^{-1} h_d}{1 + h_\parallel^H A^{-1} h_\perp}\right\}$$

In Equation 11, $h_\parallel$ denotes a component parallel to a target channel matrix in an interfering channel matrix, $h_\perp$ denotes a component orthogonal to the target channel matrix in the interfering channel matrix, and $h_d$ denotes the target channel matrix.

$A^{-1}$ of Equation 11 above is simplified into Equation 12:

$$A^{-1} = (h_\perp h_\perp^H + \sigma_{new}^2 I)^{-1} \qquad [\text{Eqn. 12}]$$
$$= \frac{1}{\sigma_{new}^2} I - \frac{1}{\sigma_{new}^2} h_\perp \left(1 + \frac{\|h_\perp\|^2}{\sigma_{new}^2}\right)^{-1} h_\perp^H \frac{1}{\sigma_{new}^2}$$
$$= \frac{1}{\sigma_{new}^2} \left(I - \frac{h_\perp h_\perp^H}{\sigma_{new}^2 + \|h_\perp\|^2}\right)$$

In Equation 12 above, $h_\perp$ denotes a component orthogonal to a target channel matrix in an interfering channel matrix, $\sigma_{new}^2$ denotes a new noise power value, and $h_d$ denotes the target channel matrix.

Accordingly, Equation 11 above is simplified into Equation 13:

$$c_2 \left\{\frac{1}{\sigma_{new}^2} - \frac{h_\perp h_\perp^H \frac{1}{\sigma_{new}^2} h_d}{\sigma_{new}^2 + \|h_\perp\|^2}\right\} = c_3 \left\{h_d - \frac{h_\perp h_\perp^H h_d}{\sigma_{new}^2 + \|h_\perp\|^2}\right\} \qquad [\text{Eqn. 13}]$$

In Equation 13 above, $h_\parallel$ denotes a component parallel to a target channel matrix in an interfering channel matrix, $h_\perp$ denotes a component orthogonal to the target channel matrix in the interfering channel matrix, $\sigma_{new}^2$ denotes a new noise power value, and $h_d$ denotes the target channel matrix.

The MMSE beamforming vector expressed by Equation 13 above is an unnormalized expression. Equation 13 above may be normalized into Equation 14:

$$w_{mmse} = \frac{w^{unNormalized}}{\|w^{unNormalized}\|} = \frac{w^{unNormalized}}{\sqrt{(w^{unNormalized})^H w^{unNormalized}}} \quad [\text{Eqn. 14}]$$

In Equation 14 above, $w_{mmse}$ denotes a normalized beamforming vector, and $w^{unNormalized}$ denotes an unnormalized beamforming vector.

Finally, Equation 14 above is simplified into Equation 15:

$$w_{mmse}^{new} = \frac{\left(h_d - \frac{h_\perp h_\|^H h_d}{\sigma_{new}^2 + \|h_\perp\|^2}\right)}{\sqrt{\left(h_d^H h_d + \frac{\|h_d^H h_\| h_\perp^H\|^2}{(\sigma_{new}^2 + \|h_\perp\|^2)^2}\right)}} \quad [\text{Eqn. 15}]$$

In Equation 15 above, $w_{mmse}^{new}$ denotes a beamforming vector used when a degradation factor is greater than or equal to a threshold, $h_\|$ denotes a component parallel to a target channel matrix in an interfering channel matrix, $h_\perp$ denotes a component orthogonal to the target channel matrix in the interfering channel matrix, $\sigma_{new}^2$ denotes a new noise power value, and $h_d$ denotes the target channel matrix.

That is, when the degradation factor is greater than or equal to the threshold, the BS calculates the beamforming vector according to Equation 15 above by using the new noise power value calculated by Equation 4.

Hereinafter, a structure and operation of a BS using a beamforming vector calculated as described above will be described in greater detail with reference to the accompanying drawings.

FIG. 3 is a block diagram illustrating a structure of a BS in a broadband wireless communication system according to an exemplary embodiment of the present invention.

Referring to FIG. 3, the BS includes a plurality of Radio Frequency (RF) receivers 302-1 to 302-N, a plurality of OFDM demodulators 304-1 to 304-N, a plurality of subcarrier demappers 306-1 to 306-N, a channel estimator 308, a degradation factor calculator 310, a beam vector calculator 312, a Receive (Rx) beamformer 314, a Transmit (Tx) beamformer 316, a plurality of subcarrier mappers 318-1 to 318-N, a plurality of OFDM modulators 320-1 to 320-N, and a plurality of RF transmitters 322-1 to 322-N.

Each of the RF receivers 302-1 to 302-N converts an RF signal received through its corresponding antenna into a baseband signal. Each of the OFDM demodulators 304-1 to 304-N divides the baseband signal provided from its corresponding RF receiver 302 in an OFDM symbol unit, removes a Cyclic Prefix (CP), and thereafter converts the resultant signal into per-subcarrier signals by performing a Fast Fourier Transform (FFT) operation. Each of the subcarrier demappers 306-1 to 306-N provides a signal, which is provided for channel estimation from its corresponding OFDM demodulator 304, to the channel estimator 308, and provides a data signal to the Rx beamformer 314. For example, the signal for channel estimation is a sounding signal or a pilot signal.

The channel estimator 308 estimates a target channel matrix and an interfering channel matrix by using the sounding signals or the pilot signals provided from the subcarrier demappers 306-1 to 306-N. Herein, a plurality of interfering channel matrixes may be present. For example, if sounding signals are used for channel estimation, the channel estimator 308 separates a sounding signal of a target MS and a sounding signal of at least one interfering MS by performing a correlation operation, and estimates a target channel matrix and at least one interfering channel matrix by using the respective separated sounding signals.

The degradation factor calculator 310 determines a degradation factor by using the target channel matrix and the at least one interfering channel matrix estimated by the channel estimator 308. More specifically, the degradation factor calculator 310 determines an MRC beamforming vector and an MMSE beamforming vector by using the channel matrixes. Further, the degradation factor calculator 310 determines the degradation factor by determining a target signal power ratio of when the MRC beamforming vector is used to when the MMSE beamforming vector is used. For example, the degradation factor is determined by Equation 3.

The beam vector calculator 312 determines a type of a beamforming vector to be used according to the degradation factor determined by the degradation factor calculator 310, and determines the beamforming vector having the determined type. If the degradation factor is less than a threshold, the beam vector calculator 312 determines an MMSE beamforming vector whose top priority is interference cancellation. For example, the MMSE beamforming vector is determined by Equation 1. Otherwise, if the degradation factor is greater than or equal to the threshold, the beam vector calculator 312 determines a new noise power value, and determines a beamforming vector by using the new noise power value. The new noise power value is a value for obtaining a signal power ratio identical to the threshold when the new noise is used to determine the MMSE beamforming vector. For example, the new noise power value is determined by Equation 4, and the beamforming vector is determined by Equation 15.

The Rx beamformer 314 performs Rx beamforming by using the beamforming vector determined by the beam vector calculator 312. In other words, the Rx beamformer 314 multiplies the beamforming vector by a signal vector received from the target MS. The Tx beamformer 316 performs Tx beamforming by using the beamforming vector determined by the beam vector calculator 312. In other words, the Tx beamformer 316 multiples the beamforming vector by a signal to be transmitted to the target MS.

Each of the subcarrier mappers 318-1 to 318-N maps a Tx signal vector, which is to be transmitted to the target MS and is provided from the Tx beamformer 316, to a subcarrier. Each of the OFDM modulators 320-1 to 320-N converts per-subcarrier signals provided from its corresponding subcarrier mapper 318 into a time-domain signal by performing an Inverse Fast Fourier Transform (IFFT) operation, and configures an OFDM symbol by inserting a CP. Each of the RF transmitters 322-1 to 322-N converts an OFDM symbol provided from its corresponding OFDM modulator 320 into an RF band signal, and thereafter transmits the RF signal through each antenna.

In the structure of the BS of FIG. 3, Tx antennas and Rx antennas are separately present. However, N Tx antennas and N Rx antennas may be constructed with N common Tx/Rx antennas. In this case, the RF receiver 302 and the RF transmitter 322 respectively connected with the Rx antennas and the Tx antennas are connected to those antennas through a duplexer.

FIG. 4 is a flowchart illustrating an operation of a BS in a broadband wireless communication system according to an exemplary embodiment of the present invention.

Referring to FIG. 4, in step 401, the BS estimates a target channel matrix and an interfering channel matrix by using sounding signals or pilot signals received from MSs. Herein, a plurality of interfering channel matrixes may be present. For example, if the sounding signals are used for channel estimation, the BS separates a sounding signal of a target MS or a sounding signal of at least one interfering MS by performing a correlation operation, and estimates a target channel matrix and at least one interfering channel matrix by using each of the separated sounding signals.

After estimating the target channel matrix and the at least one interfering channel matrix, proceeding to step 403, the BS determines an MMSE beamforming vector and an MRC beamforming vector. The MRC beamforming vector is a beamforming vector that prioritizes only a gain of the target signal without considering interference cancellation. The MMSE beamforming vector is a beamforming vector which prioritizes interference cancellation.

In step 405, the BS determines a degradation factor by using the MRC beamforming vector and the MMSE beamforming vector. In other words, the BS determines the degradation factor by determining a target signal power ratio of when the MRC beamforming vector is used to when the MMSE beamforming vector is used. For example, the degradation factor is determined by Equation 3.

After determining the degradation factor, proceeding to step 407, the BS determines whether the degradation factor is greater than or equal to a threshold. The threshold is a value for determining a type of a beamforming vector to be used according to the degradation factor. If the degradation factor is greater than or equal to the threshold, the procedure proceeds to step 409. Otherwise, if the degradation factor is less than the threshold, the procedure proceeds to step 415.

If the degradation factor is greater than or equal to the threshold, proceeding to step 409, the BS determines a new noise power value. The new noise power value is a value for obtaining a signal power ratio identical to the threshold when the new noise is used to determine the MMSE beamforming vector. For example, the new noise power value is determined by Equation 4.

After determining the new noise power value, proceeding to step 411, the BS determines a beamforming vector by using the new noise power value. For example, the beamforming vector is determined by Equation 15.

After determining the beamforming vector, proceeding to step 413, the BS performs beamforming on a signal transmitted/received with the target MS by using the determined beamforming vector.

If the degradation factor is less than the threshold in step 407, proceeding to step 415, the BS performs beamforming on a signal transmitted/received with the target MS by using the MMSE beamforming vector determined in step 403.

According to exemplary embodiments of the present invention, when a correlation between a communication channel matrix and an interfering channel matrix is great in a broadband wireless communication system, a beamforming vector capable of avoiding significant degradation of a target signal is used, thereby improving system performance.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A Base Station (BS) apparatus in a wireless communication system, the apparatus comprising:
a first calculator configured to determine a degradation factor indicating a degradation degree of a target signal due to interference cancellation by using a target channel matrix $h_d$ and at least one interfering channel matrix;
a second calculator configured to determine a new noise power value to be used to determine a beamforming vector if the degradation factor is greater than or equal to a threshold $DF_{th}$, and configured to determine the beamforming vector by using the new noise power value; and
a beamformer configured to perform beamforming on a signal transmitted/received with a target Mobile Station (MS) by using the beamforming vector,
wherein the first calculator is configured to determine the degradation factor by calculating a signal power ratio of when a first beamforming vector that prioritizes a gain of the target signal is used to when a second beamforming vector that prioritizes interference cancellation is used,
wherein the second calculator is configured to determine the new noise power value which increases according to at least one of: a signal power value of when the first beamforming vector is used, the threshold $DF_{th}$, and a square of an absolute value of a result obtained by multiplying the target channel matrix $h_d$ by a component $h_\parallel$ parallel to the target channel matrix in the at least one interfering channel matrix, and
wherein the second calculator is configured to calculate a Minimum Mean Square Error (MMSE) beamforming vector by using the new noise power value.

2. The apparatus of claim 1, wherein the second calculator is configured to determine the noise power value according to:

$$\sigma_{new}^2 = \sqrt{\frac{\|h_d h_\parallel^H\|^2 \|h_\perp\|^2}{\frac{\|h_d\|^4}{DF_{th}\|w_{mmse}^H h_d\|^2} - \|h_d\|^2}} - \|h_\perp\|^2,$$

where $\sigma_{new}^2$ denotes a new noise power value, $h_d$ denotes the target channel matrix, $h_\parallel$ denotes the component parallel to the target channel matrix in an interfering channel matrix, $h_\perp$ denotes a component orthogonal to the target channel matrix in the interfering channel matrix, $DF_{th}$ denotes a linear scale value of a degradation factor threshold, and $w_{mrc}$ denotes a Maximum Ratio Combining (MRC) beamforming vector.

3. The apparatus of claim 1, wherein the second calculator is configured to determine the beamforming vector according to:

$$w_{mmse}^{new} = \frac{\left(h_d - \frac{h_\perp h_\parallel^H h_d}{\sigma_{new}^2 + \|h_\perp\|^2}\right)}{\sqrt{\left(h_d^H h_d + \frac{\|h_d^H h_\parallel h_\perp^H\|^2}{(\sigma_{new}^2 + \|h_\perp\|^2)^2}\right)}},$$

where $w_{mmse}^{new}$ denotes a beamforming vector used when a degradation factor is greater than or equal to a threshold, $h_\parallel$ denotes the component parallel to the target channel matrix in an interfering channel matrix, $h_\perp$ denotes a component orthogonal to the target channel matrix in the interfering channel matrix, $\sigma_{new}^2$ denotes a new noise power value, and $h_d$ denotes the target channel matrix.

4. The apparatus of claim 1, further comprising an estimator configured to estimate the target channel matrix and the at least one interfering channel matrix by using one of sounding signals and pilot signals received from the target MS and at least one interfering MS.

5. A method of operating a Base Station (BS) in a wireless communication system, the method comprising:
   determining a degradation factor to indicate a degradation degree of a target signal due to interference cancellation by using a target channel matrix $h_d$ and at least one interfering channel matrix;
   determining a new noise power value to be used to calculate a beamforming vector if the degradation factor is greater than or equal to a threshold $DF_{th}$;
   determining the beamforming vector by using the new noise power value; and
   performing beamforming on a signal transmitted/received with a target Mobile Station (MS) by using the beamforming vector,
   wherein the determining of the degradation factor comprises determining the degradation factor by calculating a signal power ratio of when a first beamforming vector that prioritizes a gain of the target signal is used to when a second beamforming vector that prioritizes interference cancellation is used,
   wherein the determining of the new noise power value comprises determining the new noise power value which increases according to at least one of: a signal power value of when the first beamforming vector is used, the threshold $DF_{th}$, and a square of an absolute value of a result obtained by multiplying the target channel matrix $h_d$ by a component $h_\parallel$ parallel to the target channel matrix in the at least one interfering channel matrix, and
   wherein the determining the beamforming vector comprises calculating a Minimum Mean Square Error (MMSE) beamforming vector by using the new noise power value.

6. The method of claim 5, wherein the new noise power value is calculated according to:

$$\sigma_{new}^2 = \sqrt{\frac{\frac{\|h_d h_\parallel^H\|^2 \|h_\perp\|^2}{\|h_d\|^4}}{\frac{1}{DF_{th}\|w_{mmse}^H h_d\|^2} - \|h_d\|^2}} - \|h_\perp\|^2,$$

where $\sigma_{new}^2$ denotes a new noise power value, $h_d$ denotes the target channel matrix, $h_\parallel$ denotes the component parallel to the target channel matrix in an interfering channel matrix, $h_\perp$ denotes a component orthogonal to the target channel matrix in the interfering channel matrix, $DF_{th}$ denotes a linear scale value of a degradation factor threshold, and $w_{mrc}$ denotes a Maximum Ratio Combining (MRC) beamforming vector.

7. The method of claim 5, wherein the beamforming vector is calculated according to:

$$w_{mmse}^{new} = \frac{\left(h_d - \frac{h_\perp h_\parallel^H h_d}{\sigma_{new}^2 + \|h_\perp\|^2}\right)}{\sqrt{\left(h_d^H h_d + \frac{\|h_d^H h_\parallel h_\perp^H\|^2}{(\sigma_{new}^2 + \|h_\perp\|^2)^2}\right)}},$$

where $w_{mmse}^{new}$ denotes a beamforming vector used when a degradation factor is greater than or equal to a threshold, $h_\parallel$ denotes the component parallel to the target channel matrix in an interfering channel matrix, $h_\perp$ denotes a component orthogonal to the target channel matrix in the interfering channel matrix, $\sigma_{new}^2$ denotes a new noise power value, and $h_d$ denotes the target channel matrix.

8. The method of claim 5, further comprising estimating:
   the target channel matrix and the at least one interfering channel matrix by using one of sounding signals and pilot signals received from the target MS and at least one interfering MS.

9. A Base Station (BS) capable of communicating with a plurality of mobile stations (MS) in a wireless communication system, the base station comprising:
   a receiver configured to receive a first signal from at least one of the plurality of mobile stations;
   a transmitter configured to transmit a second signal to the at least one of the plurality of mobile stations;
   a first calculator configured to determine a degradation factor indicating a degradation degree of a target signal due to interference cancellation by using a target channel matrix $h_d$ and at least one interfering channel matrix;
   a second calculator configured to determine a new noise power value to be used to determine a beamforming vector if the degradation factor is greater than or equal to a threshold $DF_{th}$, and configured to determine the beamforming vector by using the new noise power value; and
   a beamformer configured to perform beamforming, using the beamforming vector, on at least one of the first signal received and the second signal transmitted to the at least one mobile station,
   wherein the first calculator is configured to determine the degradation factor by calculating a signal power ratio of when a first beamforming vector that prioritizes a gain of the target signal is used to when a second beamforming vector that prioritizes interference cancellation is used,
   wherein the second calculator is configured to determine the new noise power value which increases according to at least one of a signal power value of when the first beamforming vector is used, the threshold $DF_{th}$, and a square of an absolute value of a result obtained by multiplying the target channel matrix $h_d$ by a component $h_\parallel$ parallel to the target channel matrix in the at least one interfering channel matrix, and
   wherein the determining the beamforming vector comprises calculating a Minimum Mean Square Error (MMSE) beamforming vector by using the new noise power value.

10. The base station of claim 9, further comprising an estimator configured to estimate the target channel matrix and the at least one interfering channel matrix by using one of sounding signals and pilot signals received from the at least one MS and at least one interfering MS.

* * * * *